(12) United States Patent
Rossignol et al.

(10) Patent No.: US 8,973,719 B2
(45) Date of Patent: Mar. 10, 2015

(54) MOUNTING SYSTEM FOR DISK BRAKE PAD

(75) Inventors: Magali Rossignol, Corne (FR); Pascal Champion, Avrille (FR); Daniel Audinay, Barcelone (ES); Thierry Pasquet, Livry Gargan (FR); Jan Vinck, Beaufort en Vallee (FR); Matthieu Legendre, Paris (FR)

(73) Assignee: Chassis Brakes International B.V., Amsterdam (NL)

( * ) Notice: Subject to any disclaimer, the term of this patent is extended or adjusted under 35 U.S.C. 154(b) by 1263 days.

(21) Appl. No.: 12/340,983

(22) Filed: Dec. 22, 2008

(65) Prior Publication Data

US 2009/0159376 A1 Jun. 25, 2009

(30) Foreign Application Priority Data

Dec. 21, 2007 (FR) ...................... 07 09198

(51) Int. Cl.
*F16D 65/097* (2006.01)
*F16D 65/095* (2006.01)

(52) U.S. Cl.
CPC .......... *F16D 65/0978* (2013.01); *F16D 65/095* (2013.01); *F16D 65/0972* (2013.01)
USPC .................. 188/73.31; 188/73.38; 188/73.39

(58) Field of Classification Search
CPC ................ F16D 2055/0041; F16D 2055/0062; F16D 65/0977; F16D 65/0978
USPC ................... 188/73.38, 73.31, 73.39
See application file for complete search history.

(56) References Cited

U.S. PATENT DOCUMENTS

| | | | |
|---|---|---|---|
| 3,616,878 A * | 11/1971 | Girauldon | 188/73.38 |
| 3,638,765 A | 2/1972 | Flaherty et al. | |
| 3,712,423 A * | 1/1973 | Girauldon | 188/73.38 |
| 4,460,067 A | 7/1984 | Katagiri et al. | |
| 5,860,495 A | 1/1999 | Weiler et al. | |
| 5,934,417 A * | 8/1999 | Kobayashi et al. | 188/72.3 |
| 7,152,717 B2 | 12/2006 | Lelievre et al. | |
| 7,201,257 B2 | 4/2007 | Nakajima et al. | |
| 2007/0017756 A1* | 1/2007 | Takeo et al. | 188/73.39 |
| 2007/0114102 A1* | 5/2007 | Iraschko | 188/73.38 |
| 2007/0261927 A1* | 11/2007 | Iraschko et al. | 188/73.38 |
| 2008/0135353 A1* | 6/2008 | Takeo et al. | 188/73.39 |

FOREIGN PATENT DOCUMENTS

| | | |
|---|---|---|
| JP | 06-043375 U | 6/1994 |
| JP | 08-511081 | 11/1996 |

(Continued)

OTHER PUBLICATIONS

Machine translation of JP 2007-177930.*

(Continued)

*Primary Examiner* — Bradley King
(74) *Attorney, Agent, or Firm* — Michael Best & Friedrich LLP

(57) ABSTRACT

A mounting system for a brake pad in the housings of a disk brake yoke in which the brake pad comprises at its ends two mounting ears (10), each ear being mounted in a housing of a disk brake yoke. The mounting system comprises for each pad ear, a spring (5) of linear or lamella shape, intended to bear, on the one hand, below a lower face (12) of the ear and, on the other hand, on the lower face of the housing of the yoke so as to separate the lower face (12) of the ear from the lower face of the housing.

20 Claims, 8 Drawing Sheets

(56) References Cited

FOREIGN PATENT DOCUMENTS

| | | |
|---|---|---|
| JP | 2001234955 | 8/2001 |
| JP | 2004218696 | 8/2004 |
| JP | 2007177930 | 7/2007 |

OTHER PUBLICATIONS

FR 0709198 Search Report and Written Opinion, 7 pages.
Japanese Patent Office Action for Application No. 2008-309721 dated Dec. 4, 2012 (4 pages—English Translation).

* cited by examiner

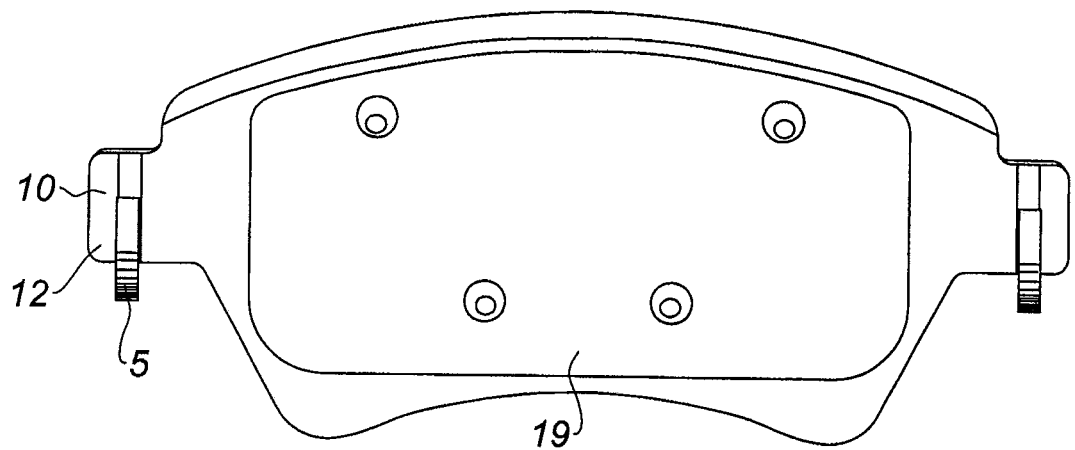
*Fig. 2a*
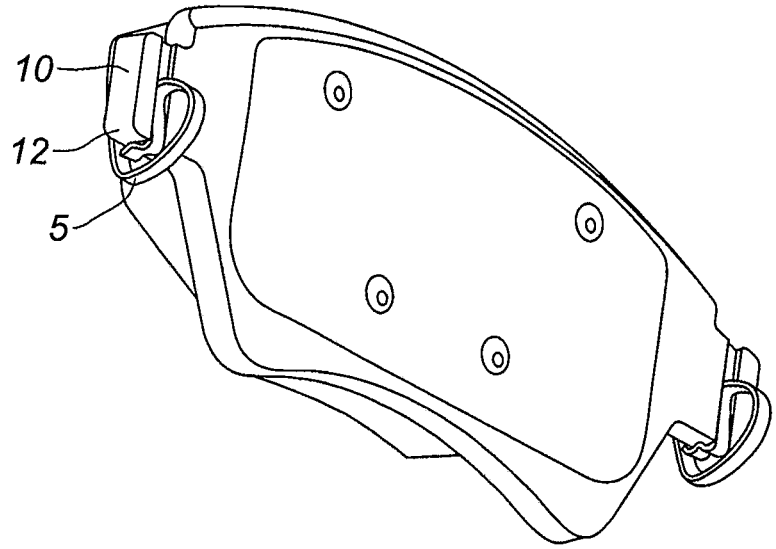
*Fig. 2b*
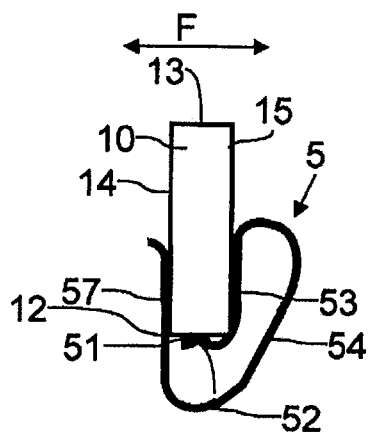 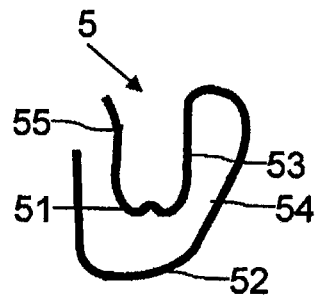 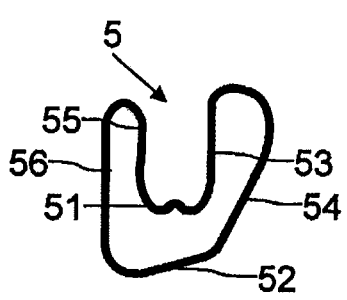
*Fig. 3a*     *Fig. 3b*     *Fig. 3c*

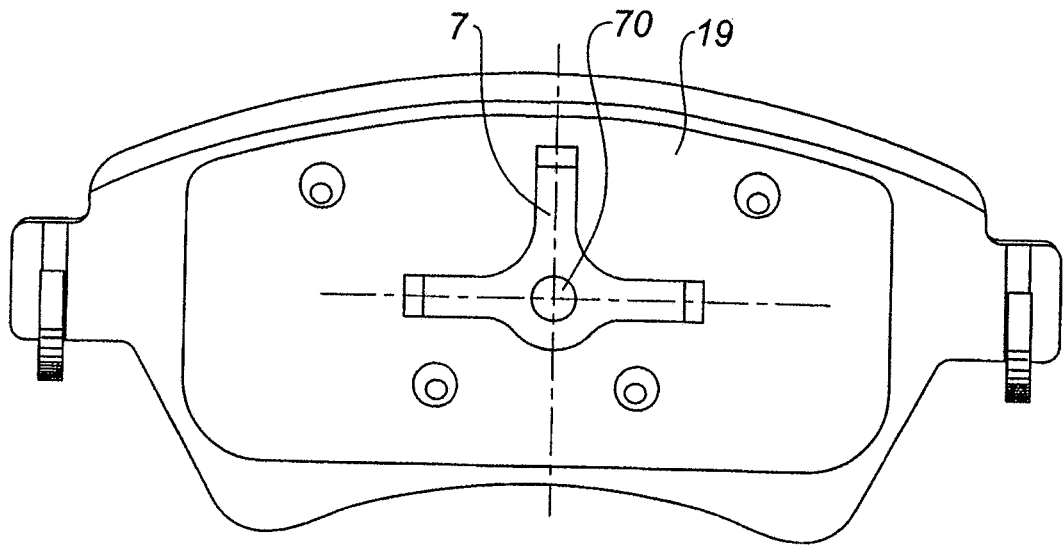
*Fig. 9a*
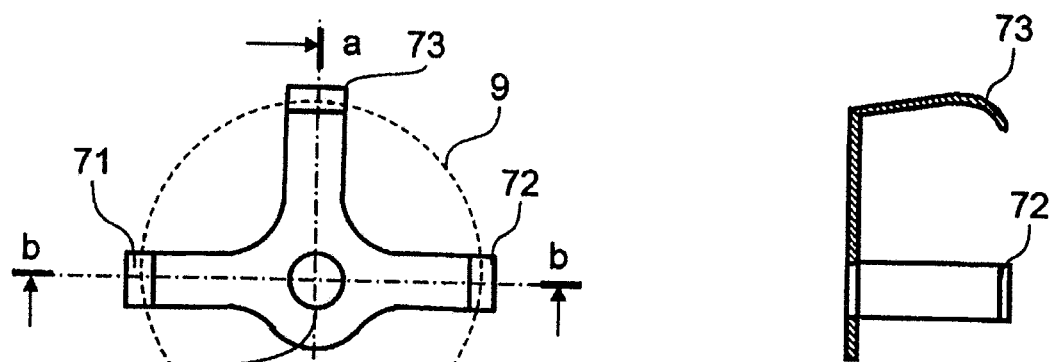 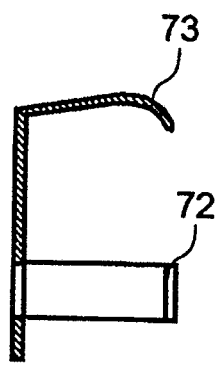
*Fig. 9b*   *Fig. 9c*
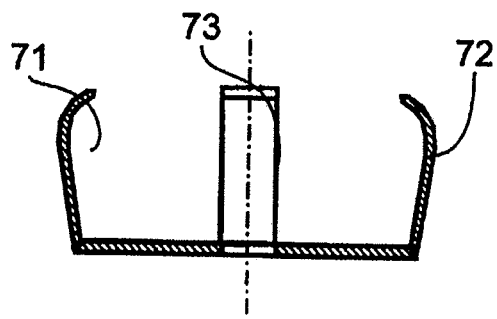
*Fig. 9d*

MOUNTING SYSTEM FOR DISK BRAKE PAD

BACKGROUND AND SUMMARY OF THE INVENTION

The invention relates to a mounting device for a brake pad in the housings of a disk brake yoke and, in particular, a device making it possible to facilitate the displacement of a brake pad support which is produced during braking and which makes it possible to avoid noise which often occurs during such an operation. The invention also relates to a disk brake provided with mounting devices according to the invention.

In a vehicle provided with disk brakes, each wheel which has to be braked by such a braking system comprises a brake disk fixed to the wheel and a braking device fixed to the chassis of the vehicle which brakes the rotational movement of the disk by friction. The braking device comprises, on each side of the brake disk, a brake pad consisting of a pad support bearing a brake pad. Each brake pad is mobile perpendicular to the plane of the disk (in a direction which will be referred to as the axial direction) and is guided by two of its ends known as "ears" in the housings of a yoke. Control members make it possible to exert a pressure on the brake pads in the axial direction. The two brake pads arranged on both sides of a disk thus permit the disk to be gripped during braking and its rotation to be braked.

During braking, the brake pads are driven in a direction which is tangential to the disk and the ears come into abutment, occasionally violently, with the base of their guide housing producing a noise known as "clonking" or knocking. To dampen the impact of the ears in their housing and thus reduce the noise, in the known manner a spring is provided which is located between each ear and its housing. This damping effect is obtained by deformation of the spring. The shape of the spring thus has to be adapted to the force exerted by the brake pad during its tangential displacement. This force depends on the mass of the pad and its driving speed. The calibration of the spring therefore, in principle, has to take account of the type of vehicle and the type of pad.

Moreover, the pad has to be able to be displaced axially as has been explained above. The ears of the pad thus have to slide in the retaining spring.

Thus there has to be both a sliding effect and a spring action on a single part.

Once the pad is in place and, due to the geometric inconsistencies and the spring action, the sliding system is deformed and produces a resilient/stiffening effect affecting the generation of noise during braking.

The subject of the invention is thus a device making it possible to improve the sliding of the ears of the pad when activating the braking.

The subject of the invention, therefore, is a mounting device for a brake pad in the housings of a disk brake yoke. Such a brake pad comprises at two of its ends two mounting ears and each ear is mounted in a housing of a disk brake yoke. The mounting device according to the invention comprises, for each pad ear, a first spring of linear or lamella shape, intended to bear, on the one hand, on the lower face of the housing of the yoke so as to separate the lower face of the ear from the lower face of the housing of the yoke.

According to one embodiment of the invention said spring comprises:
  a first bearing limb which is placed against the lower face of the ear of the pad and which is intended to bear against said lower face;
  a second sliding limb in contact with the lower face of the housing of the yoke. This limb has a curved shape. It is located parallel to a plane perpendicular to the plane of the ear and it has a convex surface intended to slide on said lower face of the housing of the yoke; and
  a third limb and a fourth limb connected to one another and making it possible to connect the first limb to the second limb to separate them from one another.

According to a variant, the device according to the invention comprises a second spring which comprises:
  a first bearing limb intended to be placed against a lateral face of the ear of the pad;
  a second sliding limb intended to be in contact with a lateral face of the housing of the yoke. This limb is located parallel to a plane perpendicular to the plane of the ear. It has a curved shape and has a convex surface intended to slide on said lateral face of the housing of the yoke;
  a third limb and a fourth limb connected to one another and making it possible to connect the first limb to the second limb to separate them from one another.

According to one advantageous embodiment of the invention, said first and second springs each comprise a fifth limb connected to the second limb of the spring and making it possible to grip the axial faces of the ear in cooperation with the third limb.

It may also be provided advantageously that said first and second springs each comprise a sixth limb connected to the first limb of the spring and make it possible to grip the axial faces of the ear of the pad in cooperation with the third limb.

According to a variant, said first and/or second springs each comprise a seventh limb connecting the sixth limb to the second limb of the spring.

According to a preferred embodiment of the invention, said first and second springs are in the form of a wire and their different limbs are located parallel to a plane which is perpendicular to the plane of the pad.

According to a variant of the invention, the mounting device may comprise a device having at least one slide plate. A first slide plate is intended to be inserted between a lateral face of a mounting ear of the pad and a lateral face of a housing of the yoke. This first slide plate is coupled mechanically by a resilient hinge of which the resilience is greater than the resilience of the first slide plate to a fixing device intended to be fixed to the yoke.

Advantageously, the first slide plate is coupled at one end to the fixing device such that its opposing end is intended to exert a pressing force on the face of said housing of the yoke when said mounting device is mounted on the yoke.

Advantageously it may also be provided that one edge of said first slide plate is coupled to an edge of a second slide plate forming part of the fixing device. This second fixing plate is intended to be pressed against a radial face of said housing of the yoke, said hinge comprising at least one connecting element of which the length is less than the length of said edges of the first and second slide plates.

According to an advantageous embodiment of the invention, the angle formed by the first and second plate, when the mounting device is not mounted on a disk brake yoke, is greater than the angle formed by the lateral and radial faces of the housing of a yoke on which the mounting device is intended to be mounted.

It may possibly be provided, therefore, that said angle formed by the first and the second plate, when the mounting device is not mounted on a disk brake yoke, is greater than 90°.

According to one embodiment of this fixing device, this device comprises a first leaf spring which cooperates with the second slide plate to grip a fixing part which forms part of the yoke.

It may also be provided that the fixing device comprises a second and a third leaf spring which grip said fixing part which forms part of the yoke.

According to one advantageous embodiment of the invention, the first slide plate and/or the second slide plate are made of stainless steel.

According to a further variant of the invention, the mounting device may comprise a coupling device fixed to the face of the pad, intended to be located opposite a brake operating piston, substantially in a central region of the brake pad. This coupling device is intended to couple the pad to the brake operating piston and comprises resilient blades which are intended to grip the periphery of said operating piston.

This coupling device comprises two blades located in a lateral direction (X) and intended to be diametrically opposed relative to the axis of the brake operating piston.

Advantageously, a further blade located in a radial direction (Y) is also provided, and intended to be above said brake operating piston.

The invention also relates to an application of the mounting devices thus disclosed to a disk brake, to guide the brake pads.

Advantageously, such a disk brake comprises a mounting device associated with each ear of the brake pads.

BRIEF DESCRIPTION OF THE DRAWINGS

The different subjects and features of the invention will appear more clearly from the following description and from the accompanying drawings, in which:

FIG. 2a shows a front view of a brake pad provided with an embodiment of a mounting device according to the invention, FIG. 2b shows a perspective view of the brake pad of FIG. 2a, FIGS. 3a to 3c, show different embodiments of the mounting device according to the invention, FIG. 9a shows a front view of a brake pad provided with a further variant of the mounting device according to the invention, FIGS. 9b to 9d respectively are front views in section aa and in section bb of an embodiment of the mounting device of FIG. 9a.

DETAILED DESCRIPTION

Figure 1:
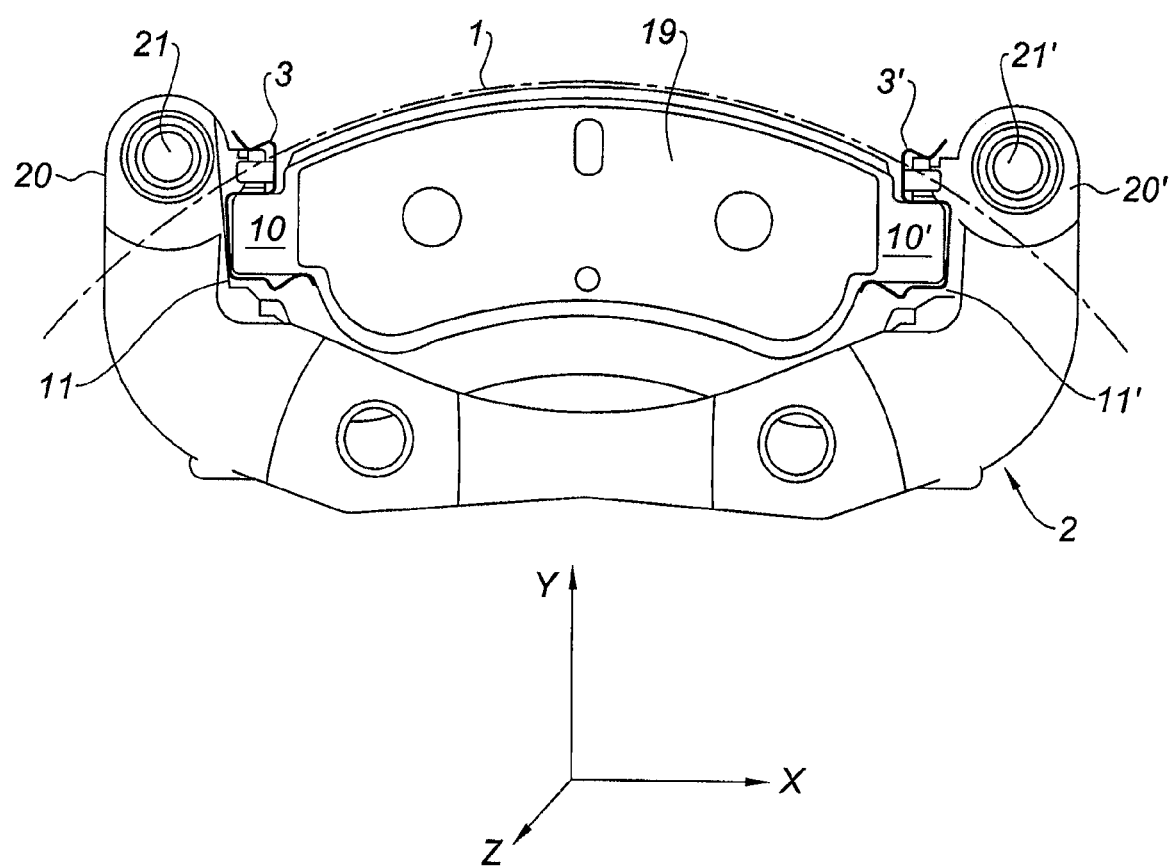
FIG. 1 shows an embodiment for mounting a brake pad in a disk brake yoke according to the prior art.

Referring to FIG. 1, firstly a mounting system is disclosed for a brake pad in a disk brake yoke as known in the prior art.

In the following description, the terms:
"radial" denotes an element located according to the radial axis of the system (the Y-axis in FIG. 1);
"lateral" denotes an element located according to an axis parallel to a tangent to the disk 1 (the X-axis in FIG. 1); and
"axial" denotes an element located according to an axis perpendicular to the plane of the disk 1 (the Z-axis in FIG. 1).

The yoke 2 comprises two arms, such as at 20, arranged on both sides of a disk 1 (shown in dash-dotted lines in FIG. 1). These two arms are connected by two bridge elements 21 and 21' extending axially and arranged radially beyond the disk 1. Each arm has at its ends grooves or housings 11 and 11' in which the terminal ears 10 and 10' of a brake pad are placed.

The terminal ears 10 and 10' of the pad are mounted in the housings 11 and 11' using springs 3 and 3'. The ears 10 and 10' slide axially in the springs 3 and 3' (i.e. perpendicular to the plane of the figure).

The operation of such a disk brake is well known in the prior art and will not be described in more detail.

The role of the springs 3 and 3' is to dampen the impacts of the ears of the pads against the base of the housings when the pads are driven by the disk 1 during braking. This damping is produced by the deformation of the springs when they are compressed under the action of the force of the pads.

However, during braking, the brake pads have to be displaced axially and it frequently occurs that the sliding of the ears of the pads in these springs causes the noise which may be perceived in the vehicle passenger compartment.

The invention thus provides a device which makes it possible to mount a brake pad in a disk brake yoke and which makes it possible to reduce or eliminate this noise.

FIGS. 2a to 3a show an embodiment of the device of the invention. This device essentially comprises a spring of a specific shape which grips two axial faces of an ear of a brake pad. For example, in FIG. 2a, this spring 5 is mounted on the ear 10 of the pad 19.

The perspective view of FIG. 2b shows that the spring 5 grips two axial faces of the ear 10 and that it has a lower part intended to bear against a lower face of a housing of the yoke as will be described below.

The spring 5 is in the form of a wire but it may also be of lamella shape.

FIG. 3a shows an embodiment of such a spring 5 mounted on the ear 10 of a pad.

This spring comprises:
a first limb 51 which bears against the lower face 12 of the ear 10;
a second limb 52 which is intended to be in contact with the lower face of a housing of the yoke as will be disclosed below. This limb has a curved shape. It is located parallel to a plane perpendicular to the plane of the ear and has a convex surface intended to slide on the lower face of the housing; and a third limb 53 and a fourth limb 54 which are connected to one another and which make it possible to connect the first limb to the second limb to separate them from one another. These limbs 53 and 54 have resilient features and make it possible to separate the limbs 51 and 52 from one another.

In this manner, when the ear 10 and its mounting spring 5 are placed in a housing of a disk brake yoke, the limb 52 is in contact with the lower face of the housing. The limb 51 tends to push the ear 10 upward and to press the face 13 of the ear against the upper face of the housing.

When braking is activated, the brake pad is controlled such that the ear 10 is displaced in the direction F (see FIG. 3a). The limb 52 of the spring is also displaced in this direction F. Due to the curved and convex shape of the limb 51, the spring slides easily on the lower face of the housing of the yoke.

Moreover, the spring comprises a limb 57 connected to the limb 52 and which is intended to be in contact with the lateral (axial) face 14 of the ear. The limbs 57 and 53 grip the axial faces 14 and 15 of the ear which permits a mounting of the spring on the ear 10.

FIG. 3b shows a variant of the spring in which a limb 55 is connected to the first limb 51 and permits the faces 14 and 15 of the ear to be gripped in cooperation with the limb 53.

FIG. 3c shows a variant of FIG. 3b in which a limb 56 connects the limbs 52 and 55 which permits the spring to be stiffened.

Figure 4A:
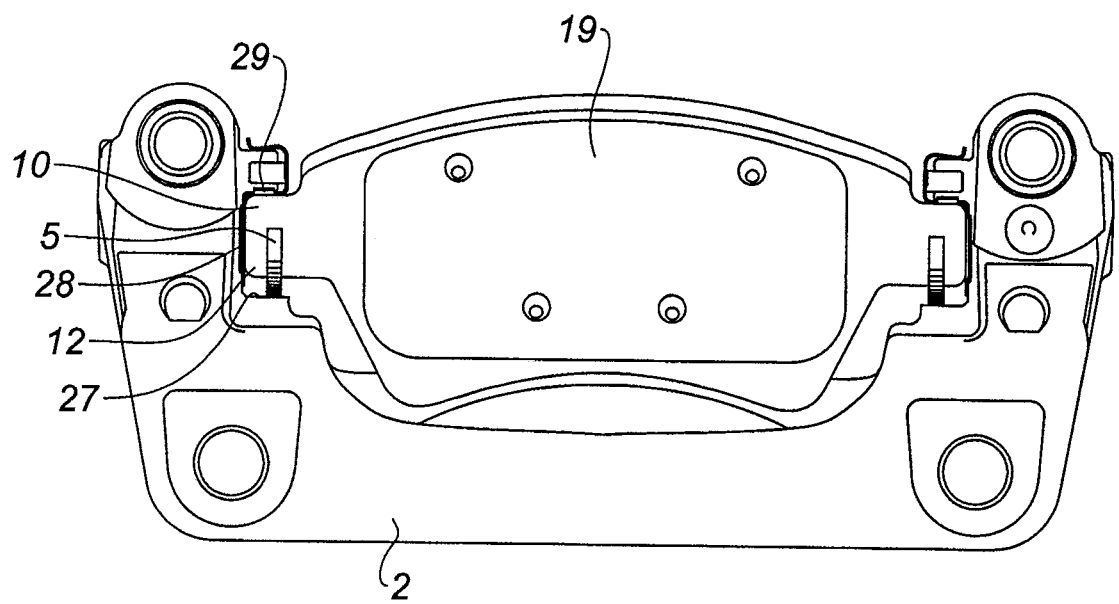
FIG. 4a shows a front view of a brake pad mounted in a disk brake yoke using the mounting devices according to the invention.

FIG. 4a shows a brake pad 19 mounted in a yoke 2. The ears of the pad are placed in the housings of the yoke. The spring 5 grips the ear 10. It exerts a pressure oriented downwards on the lower face 27 of the housing by means of its limb 52 (FIGS. 3a to 3c) and a pressure oriented upwards on the lower face 12 of the ear of the pad by means of its limb 51. The spring 5, therefore, forces the ear of the pad to be pressed against the upper face 29 of the housing of the yoke.

Figure 4B:
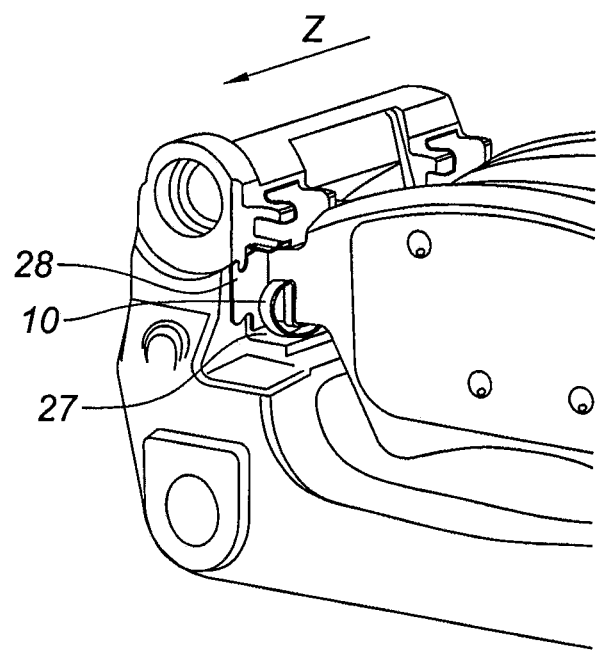
FIG. 4b shows a partial perspective view of the mounting of FIG. 4a, FIG. 5a shows a front view of a brake pad provided with a variant of a mounting device according to the invention.

FIG. 4b shows a partial perspective view of the mounting of FIG. 4a. It is seen, therefore, that the pad 10 may slide easily in the axial direction Z due to the rounded shape of the limb 52 of the spring 5.

Referring to FIGS. 5a to 5e, a variant of the mounting device according to the invention will be disclosed. According to this variant, each ear is provided with a second spring 6 similar to the spring 5. It is mounted on the ear 10 according to a plane perpendicular to the plane of the spring 5 (see FIG. 5a).

Figure 5A:
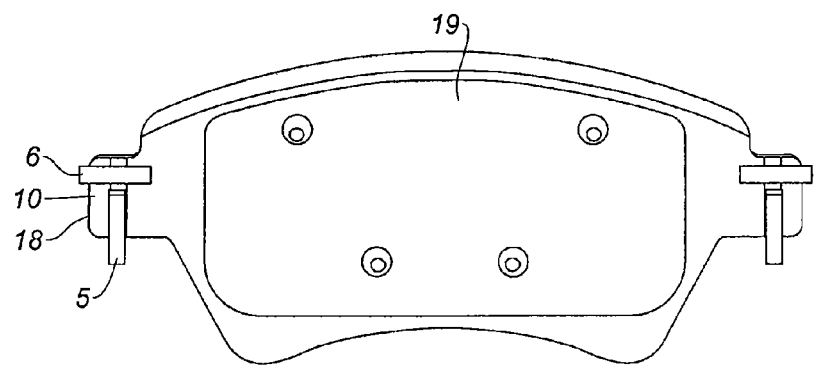
FIG. 5b shows a front view of a brake pad mounted in a disk brake yoke using mounting devices according to those of FIG. 5a, FIGS. 5c to 5e show embodiments of springs which may be applied to the device of FIGS. 5a and 5b, FIG. 6a, shows a front view of an embodiment of the mounting device according to the invention of a brake pad in the housings of a disk brake yoke.
Figure 5B:
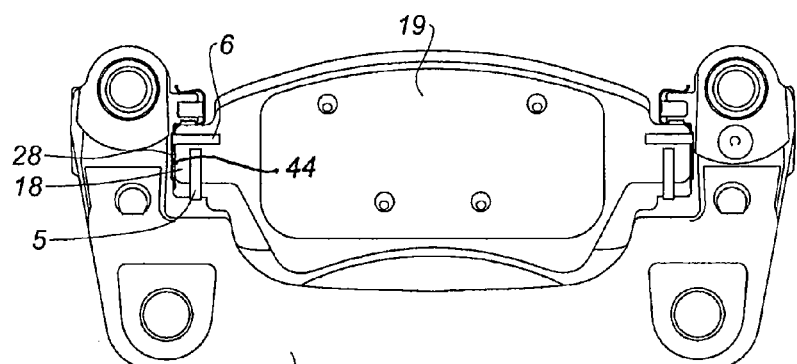

As is shown by FIG. 5b, the spring 6 is intended to bear against the radial face 28 of the base of the housing of the yoke.

Figures 5C, 5D, 5E:
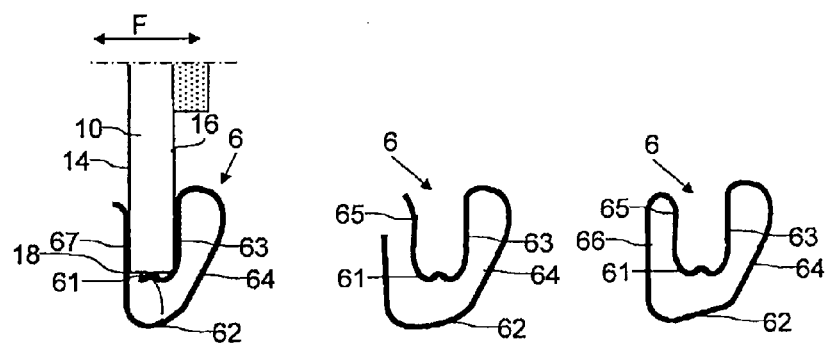

FIGS. 5c to 5e reveal that this spring 6 may be designed in the same manner as the spring 5.

This spring 6 is to be disclosed in more detail referring to FIG. 5c.

The limb 61 is intended to bear against the lateral face 18 of the ear of the pad. The limb 62 is intended to bear against the lateral face 28 of a housing of the yoke (see FIG. 5b). The limbs 63 and 67 grip the axial faces 14 and 16 of the ear 10. The limb 64 connects the limb 61 to the limb 62.

FIGS. 5d and 5e show embodiments of the spring 6 similar to the embodiments of the spring 5 which are shown by FIGS. 3b and 3c.

The spring 6 is oriented in an axial plane which permits an axial sliding of the pad.

The invention also relates to a further variant of the mounting device of the brake pad according to the invention.

Figures 6A, 6C:
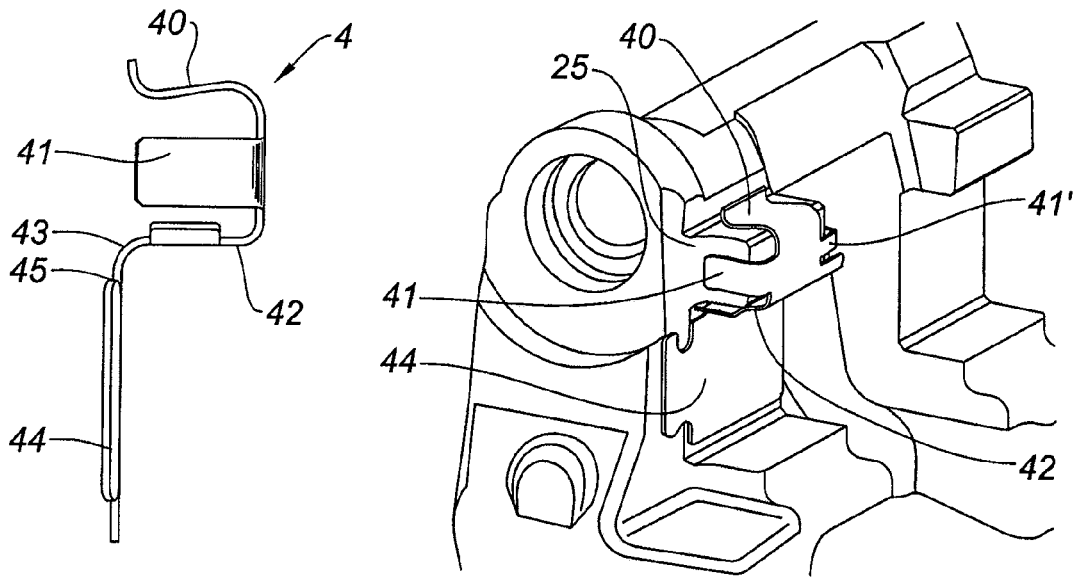
FIGS. 6c and 6d show, respectively, a perspective view and a front view of the mounting of FIG. 6b.

According to this variant, a mounting device as shown in side view in FIG. 6a is also provided.

This device comprises a plate 44 which will be referred to as a slide plate, and a fixing device 40-41-42. The slide plate is connected at one end 45 to the fixing device by a hinge 43. It is intended to be pressed against the lateral face 22 of the housing 11 of the yoke, this lateral face 22 forming the base of the housing.

The fixing device comprises a further sliding blade 42 intended to be pressed against the radial face 26 (or upper face) of the housing 11. The fixing device further comprises a leaf spring 40 which, in cooperation with the slide plate 42, grips a stud 25 forming part of the yoke.

Figures 6B, 6D:
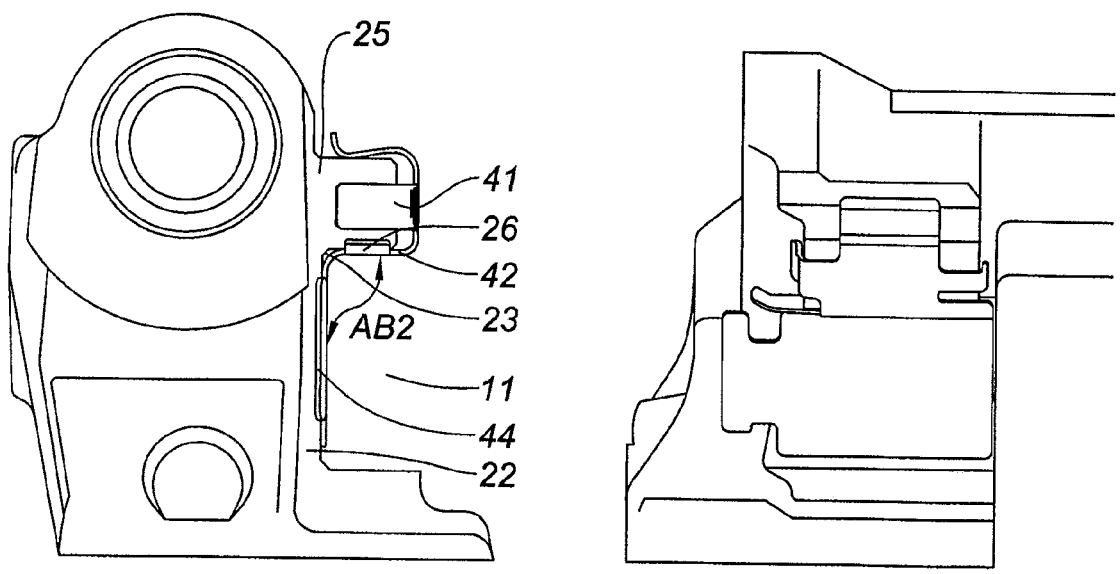
FIG. 6b shows a front view of the device of FIG. 6a mounted on a disk brake yoke.

As is shown in the front view of FIG. 6b and in the perspective FIG. 2c, when the fixing device is mounted on the yoke, the fixing device is plugged onto the stud 25 with the blade 40 and the plate 42 located on both sides of the stud 25. Moreover, advantageously, the fixing device may comprise two leaf springs 41 and 41' (see FIG. 6c) which grip the sides or radial faces of the stud 25.

When the mounting device according to the invention is mounted on the yoke, the fixing device is slipped over the stud 25 and the leaf springs 40, 41 and 41 retain said fixing device efficiently in position (FIG. 6c). The slide plates 42 and 44 are pressed respectively against the lateral faces 22 and radial faces 26 of the housing 11.

Figure 7A:
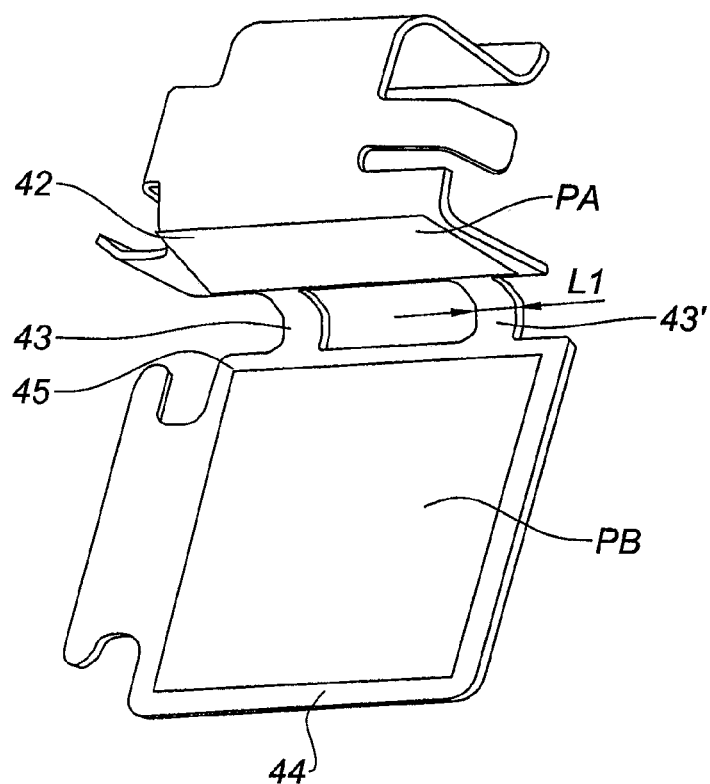
FIG. 7a shows a perspective view making it possible to explain the functions of the elements of the mounting device of a brake pad according to the invention.

FIG. 7a shows a preferred embodiment of the invention in which the end 45 of the slide plate 44 is connected by two hinge elements 43 and 43' to the slide plate 42. These hinge elements have an axial length L1 which is very short compared to the length of the edge of the end 45 of the plate 44. In this manner, the hinges 43 and 43' have a high elastic flexibility. The plates 44 and 42 may be pressed efficiently against the faces of the housing 11 of the yoke. The sliding faces PA and PB (FIG. 7a), against which an ear of a brake pad slides, are thus the faces which will have a high degree of stability.

Figures 7B, 7C:
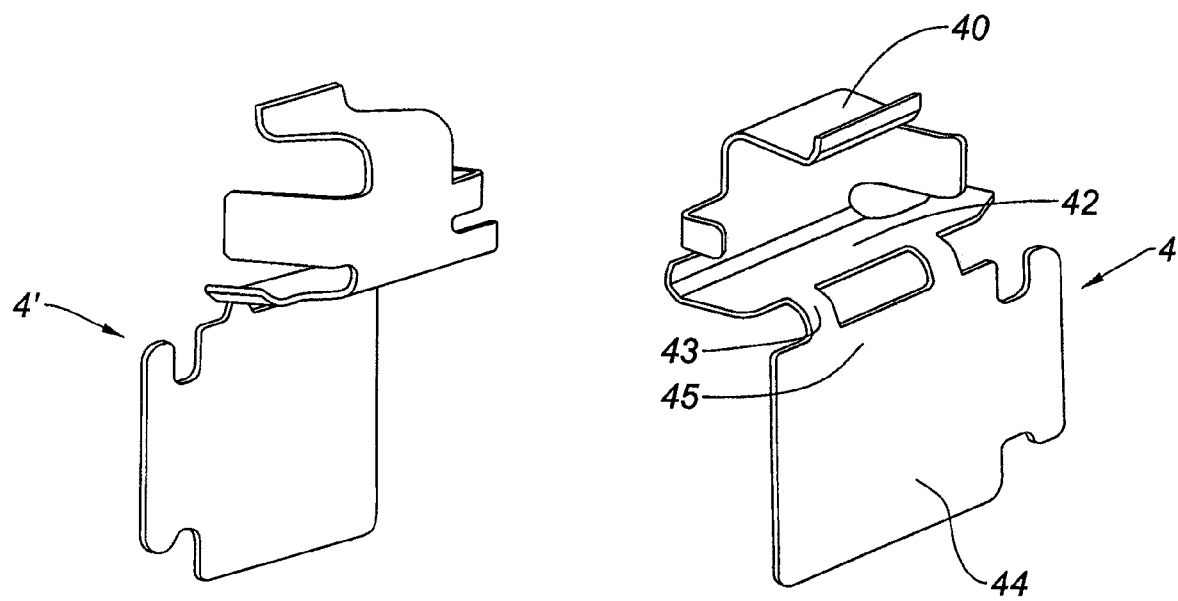
FIGS. 7b and 7c show perspective views of the mounting devices of the two ears of a pad.

FIGS. 7b and 7c show two devices according to the invention permitting the mounting of a brake pad. The mounting device 4 will be used for mounting an ear of the pad and the device 4' will be used for mounting the other ear.

Figure 8A:
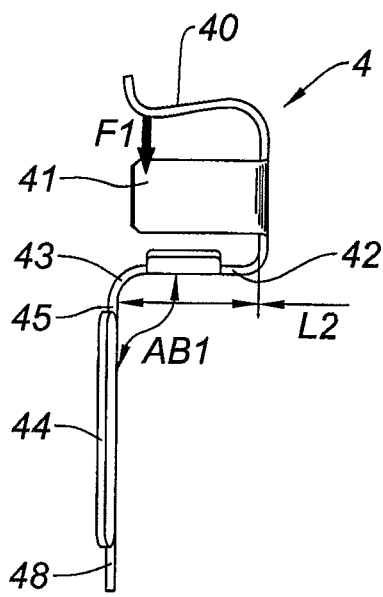
FIG. 8a shows a front view of the mounting device of FIG. 6a, on which are indicated the features of this device.
Figure 8B:
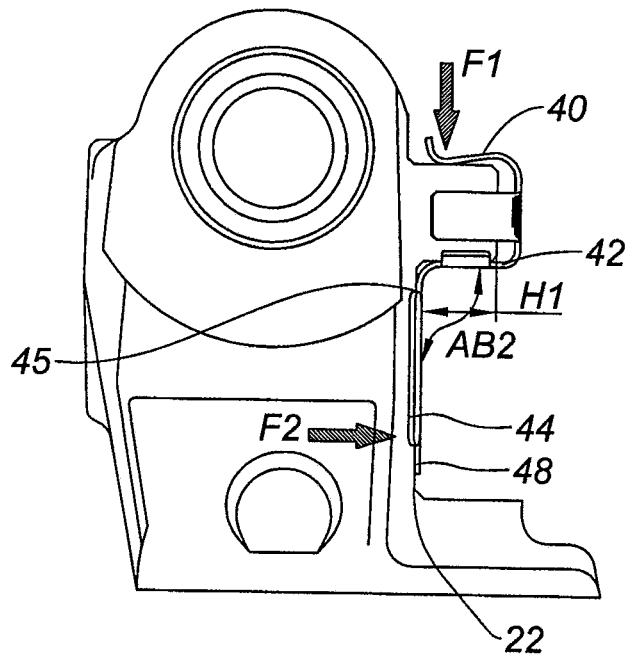
FIG. 8b shows a front view of the device of FIG. 8a mounted on a disk brake yoke with the exerted forces indicated.
Figure 8C:
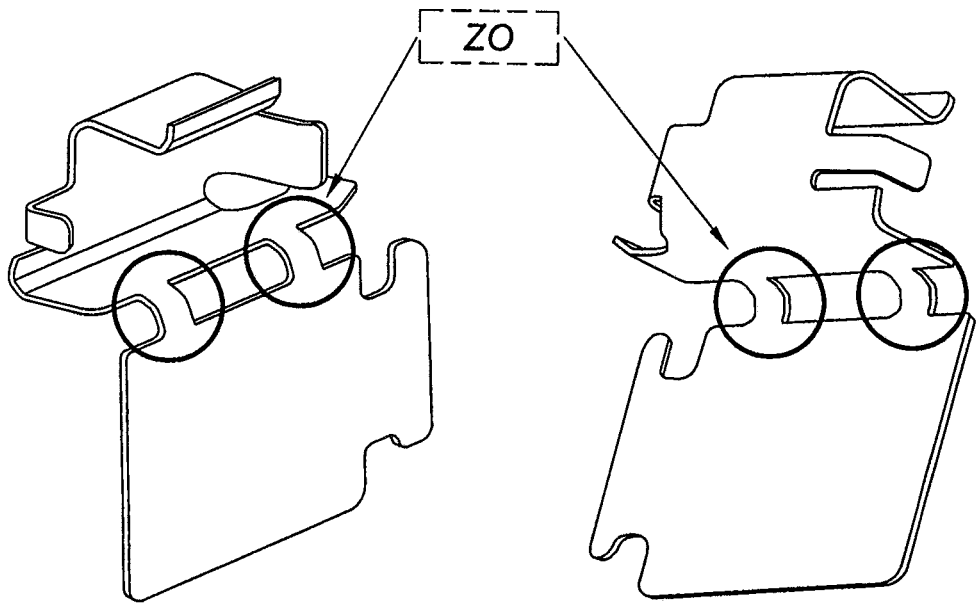
FIG. 8c shows a perspective view of the device according to the invention on which the resilient joints of the device are revealed.

FIGS. 8a to 8c show in more detail the design of the mounting device of FIG. 8a.

More specifically, according to the invention, when the mounting device is not mounted on a brake disk yoke, the slide plates 44 and 42 are at an angle AB1 when the device is at rest and do not tolerate any stress. This angle is greater than the angle AB2 formed by the lateral and radial faces (26 and 22 in FIG. 6b) of the housing 11 of the yoke.

When the mounting device is mounted on the stud 25 of the yoke with the slide plates 44 and 42 located inside the housing:

the slide plate 42 is pressed against the radial upper face (26 on FIG. 6b) of the housing due to the force F1 exerted by the leaf spring 40 (FIG. 8b); and the slide plate 44 is pressed against the lateral face 22 of the housing of the yoke.

The slide plates adopt an angle AB2 relative to one another which is equal to the angle formed by the lateral and radial faces of the housing of the yoke. Due to the fact that the angle AB1 is greater than the angle AB2 and that the end 45 is pressed against the lateral face 22 of the housing, the end 48 bears against the face 22 and a reaction force is exerted by the face 22 on the end 48 of the plate 44.

In the event that the brake pad is provided with springs 5, such as has been disclosed in relation to FIGS. 2a to 4b, the upper (radial) face 13 of each ear is in contact with the slide plate 42 of the device 4. The radial face 18 of each ear is in contact with the slide plate 44 of this device 4.

In the event that the pad is further provided with a spring 6 (FIGS. 5a to 5e), the limb 62 of each spring 6 is in contact with a slide plate 44 and slides on this plate. It is thus observed that:
- the sliding function of the ear of the pad is carried out on two planes oriented at an angle; and
- the two slide plates when in position are in perfect abutment with the two planes of the housing of the yoke.

Moreover, the fixing device and, in particular, the leaf spring 40 which exerts a pressing force F1 ensures a pressing of the slide plate 42 against the opposing face of the yoke with a pressing force F1.

During the mounting of the mounting device according to the invention on the yoke, the slide plate 44 comes into contact with the opposing face (lateral face) of the housing by deformation of the hinges 43 and 43' (shown in FIG. 7a). The design of these hinges minimizes the deformation of the contact surface of the slide plate 44 with the face 22 of the housing.

The hinges are designed to have a pressing force F2 for the slide plate 44 which is lower than the radial (or tangential) force αF1 resulting from the force F1 of the leaf spring 40.

Once the brake pad is in position, decoupling the spring function from the sliding function makes it possible to reduce, or even to eliminate, specific conditions for the occurrence of noise and, in particular, in the case of low braking pressures of the parking maneuver type.

The greater the flexibility of the hinge system, the lower the force F2.

According to one embodiment of the invention, the slide plates 44 and 42 are stainless steel ensuring that the ears of the brake pads slide easily.

It will be noted that it is expedient to provide a length L2 of the slide plate 42 which is greater than the height H1 of the projection 25 so that the end 45 of the plate 44 may be pressed against the face 22 of the housing of the yoke.

FIGS. 9a to 9d show a further variant of the mounting device of a brake pad according to the invention.

This device comprises a nesting part 7 or a part which has claws for nesting on the external surface of a brake piston.

This part is fixed to the face of the pad which opposes the face bearing the brake pad. Said face is thus the face of the pad on which the brake piston acts. By way of example, the part 7 comprises a central hole 70 making it possible to fix it to the pad.

FIGS. 9b to 9d show in more detail an embodiment of this part 7. It comprises, for example, blades 71, 72, 73 which are substantially parallel to an axial direction. These blades are intended to nest around a brake piston shown by the dotted lines 9 in FIG. 9b.

As shown in the views in section aa and bb of FIGS. 9c and 9d, the free ends of the blades 71 to 73 may be advantageously bent back toward the axis of the device to allow a more efficient hooking on the external wall of the brake piston.

In FIGS. 9b to 9d, three blades 71 to 73 have been provided but according to a variant it is possible to provide only the blades 71 and 72.

According to a further variant, four blades could be provided, the fourth blade being thus symmetrical with the blade 73 relative to the center of the device.

The object of this part 7 is to produce a coupling of the brake pad 19 with a brake piston such that this coupling has a certain flexibility and permits, in particular, a small lateral displacement of the brake pad without producing a lateral force on the brake piston.

This part 7 may be used for mounting a brake pad in combination with the spring device 5 disclosed in relation to FIGS. 2a to 4b.

It may also be used with the spring device 6 of FIGS. 5a to 5e.

It may also be provided to use said part with the device comprising sliding blades of FIGS. 6a to 8c.

The invention claimed is:

1. Mounting device for a brake pad in housings of a disk brake yoke, said brake pad (19) including a mounting ear (10, 10') at each end of the brake pad and mounted in a housing (11, 11') of a disk brake yoke (2), the mounting device comprising:
   a first spring (5) of linear or lamella shape for each ear, the first spring bearing between a lower face (12) of the ear and a lower face (27) of the housing of the yoke so as to separate the lower face (12) of the ear from the lower face (27) of the housing,
   wherein said first spring includes:
      a first bearing limb (51) configured to be placed against the lower face (12) of the ear of the pad, the first limb (51) having a curved, wavy profile along the lower face (12) of the ear;
      a second sliding limb (52) configured to contact the lower face (27) of the housing, the second sliding limb having a curved shape, being located parallel to a plane perpendicular to the plane of the ear and having a convex surface to slide on said lower face of the housing;
      a third limb (53) and a fourth limb (54) connected directly to one another and connecting the first limb to the second limb to separate them from one another; and
      a sixth limb (55) connected to the first limb (51) of the spring and allowing gripping of the axial faces of the ear of the pad in cooperation with the third limb (53).

2. Mounting device according to claim 1, further comprising:
   a second spring (6), the second spring including:
      a first bearing limb (61) to be placed against a lateral face (18) of the ear of the pad;
      a second sliding limb (62) to contact with a lateral face (21) of the housing of the yoke, the second sliding limb having a curved shape and being located parallel to a plane perpendicular to the plane of the ear and having a convex surface to slide on said lateral face of the housing; and
      a third limb (63) and a fourth limb (64) connected to one another and connecting the first limb (61) to the second limb (62).

3. Mounting device according to claim 2, wherein said second spring comprises a sixth limb (65) connected to the first limb (61) of the spring and allowing gripping of the axial faces of the ear of the pad in cooperation with the third limb (63).

4. Mounting device according to claim 3, wherein the second spring comprises a seventh limb (66) connecting the sixth limb (65) to the second limb (62) of the spring.

5. Mounting device according to claim 3, wherein said first and second springs are in the form of a wire and limbs of the first and second springs are located parallel to a plane which is perpendicular to the plane of the pad.

6. Mounting device according to claim 1, further comprising a first slide plate (44) to be inserted between a lateral face of a mounting ear of the pad and a lateral face (22) of a housing of the yoke, the first slide plate being coupled mechanically by a resilient hinge (43), the resilience of which is greater than the resilience of the first slide plate, to a fixing device (40, 41, 42) to be fixed to the yoke.

7. Mounting device according to claim 6, wherein the first slide plate is coupled at one end (45) to the fixing device (40, 41, 42) such that an opposing end (48) of the first slide plate exerts a pressing force on the face of said housing of the yoke when said mounting device is mounted on the yoke.

8. Mounting device according to claim 7, wherein one edge of said first slide plate is coupled to an edge of a second slide plate (42) forming part of the fixing device, said second fixing plate being pressed against a radial face (23) of said housing of the yoke, said hinge (43) comprising at least one connecting element having a length less than a length of said edges of the first and second slide plates.

9. Mounting device according to claim 8, wherein the angle formed by the first and second plate (44, 42), when the mounting device is not mounted on a disk brake yoke, is greater than the angle formed by the lateral (22) and radial (23) faces of the housing of a yoke on which the mounting device is to be mounted.

10. Mounting device according to claim 9, wherein said angle formed by the first and the second plate (44, 42), when the mounting device is not mounted on a disk brake yoke, is greater than 90 degrees.

11. Mounting device according to claim 10, wherein the fixing device comprises a first leaf spring (40) which cooperates with the second slide plate (42) to grip a fixing part (25) which forms part of the yoke.

12. Mounting device according to claim 11, wherein the fixing device comprises a second and a third leaf spring (41, 41') which grip said fixing part (25) which forms part of the yoke.

13. Mounting device according to claim 6, wherein the first slide plate (44) and/or the second slide plate (42) are made of stainless steel.

14. Mounting device according to claim 1, further comprising a coupling device (7) fixed to the face of the pad, to be located opposite a brake operating piston, substantially in a central region of the brake pad, said coupling device coupling the pad to a brake operating piston and comprising resilient blades which grip the periphery of said operating piston.

15. Mounting device according to claim 14, further comprising two blades (71, 72) located in a lateral direction (X) and are diametrically opposed relative to the axis of the brake operating piston.

16. Mounting device according to claim 14, further comprising a blade (73) located in a radial direction (Y) and above said brake operating piston.

17. Mounting device according to claim 1, wherein the third limb (53) and the fourth limb (54) form opposing legs of a U-shaped portion of the first spring (5).

18. Mounting device according to claim 1, wherein the sixth limb (55) and the third limb (53) form a U-shaped portion of the first spring (5).

19. Mounting device according to claim 3, wherein the third limb (53) and the sixth limb (55) form opposing legs of a first U-shaped portion of the first spring (5), and the third limb (53) and the fourth limb (54) form opposing legs of a second U-shaped portion of the first spring (5) having an inverse orientation to the first U-shaped portion.

20. A disk brake comprising:
at least one mounting device to guide brake pads, each brake pad (19) including a mounting ear (10, 10') at each end of the brake pad and mounted in a housing (11, 11') of a disk brake yoke (2), and each of the mounting devices comprising:
a first spring (5) of linear or lamella shape for each of the ears, the first spring bearing between a lower face (12) of the ear and a lower face (27) of the housing of the yoke so as to separate and urge the lower face (12) of the ear from the lower face (27) of the housing, wherein said spring comprises:
a first bearing limb (51) configured to be placed against the lower face (12) of the ear of the pad;
a second sliding limb (52) configured to contact the lower face (27) of the housing, the second sliding limb having a curved shape, being located parallel to a plane perpendicular to the plane of the ear and having a convex surface to slide on said lower face of the housing;
a third limb (53) and a fourth limb (54) connected directly to one another and connecting the first limb to the second limb, and
a sixth limb (55) connected to the first limb (51) of the spring and allowing gripping of the axial faces of the ear of the pad in cooperation with the third limb (53),
wherein the first limb (51) has a curved, wavy profile along the lower face (12) of the ear.

* * * * *